Feb. 10, 1948. C. VOORHIES 2,435,935
PIN
Filed June 25, 1945

INVENTOR.
CARL VOORHIES
BY
McDonald and Teague
ATTORNEYS

UNITED STATES PATENT OFFICE 2,435,935

PIN

Carl Voorhies, Birmingham, Mich., assignor to Eaton Manufacturing Company, Cleveland, Ohio, a corporation of Ohio Application June 25, 1945, Serial No. 601,413

6 Claims. (Cl. 309—19)

This invention relates to wrist or cross head pins and more particularly to a novel construction thereof.

Broadly the invention comprehends a pin for connecting a force transmitting member with a member to be reciprocated thereby, the external surface of said pin having a multiple curved surface such that the maximum diameter of the curved surfaces are received substantially in the center of the corresponding bearings of the thrust member and member to be reciprocated thereby.

It has been the conventional practice in the past in the manufacture of wrist or cross head pins to provide the pins with either a substantially uniform external diameter throughout their length or to incorporate a spherical section centrally of a pair of uniform cylindrical end portions, said pins being preferably fitted very closely into bearings of members connected by the pins in full bearing area contact. Although pins of this type are universally used they have not been entirely satisfactory due to the fact in view of their close fitting relationship with the bearings supporting same that any deflection of the pins imposes heavy stresses on the bearings over localized areas thereof tending to bind the pins in the bearings thereby causing excessive wear of the pins and bearings. The pins defined by the instant invention because of their improved external surface construction eliminate any tendency to bind in the bearings by which they are adapted to be supported thereby overcoming the deficiencies in previous pins of a similar nature.

An object of this invention is to provide a wrist pin that may be closely fitted to the parts which it connects.

Another object of the invention is the provision of a wrist pin whereby load stresses may be more uniformly distributed.

Another object of the invention is the provision of a pin having a toroidal surface and adapted to have limited bearing contact with its associated bearing supports, that will not decrease under deflecting loads.

A further object of the invention is the provision of a wrist pin for connecting a thrust member and a member to be reciprocated thereby, said pin having line bearing contact respectively with the thrust member and the member to be reciprocated thereby.

A further object of the invention is the provision of a pin for connecting two members together, said pin having bearing contact with the connected members that increases proportionately with the load applied.

A further object of the invention is to provide a wrist pin having a plurality of external toroidal sections.

A still further object of the invention is the provision of a wrist pin for connecting two members together whereby undue pin and bearing wear is eliminated.

A yet further object of the invention is the provision of a pin for coupling two members together, said pin having curved surfaces supported by the members such that the load is maximum on a line bearing contact and diminishes to zero at a point determined by the load imposed thereon and the extremities of the bearing.

And yet, a still further object of the invention is the provision of a wrist pin for connecting a rod and piston together capable of materially lowering the stresses that are created by deflection and at the same time reduce the friction of the bearings and preventing binding between the pin and the respective rod and piston.

Other objects and advantages of the invention will appear from the following description taken in connection with the drawings, forming a part of the specification, and in which.

Figure 1:
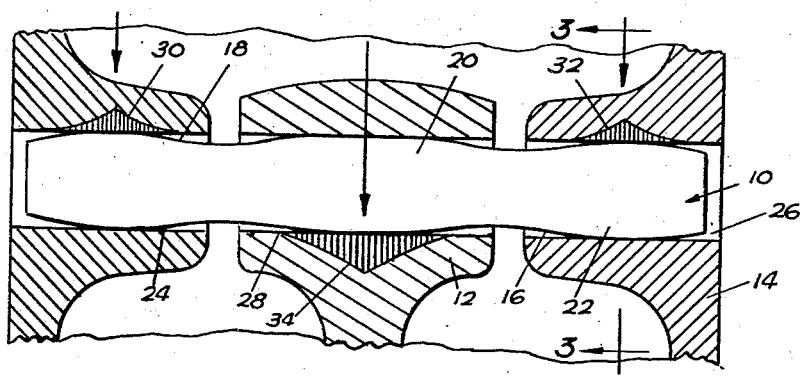
Fig. 1 is a fragmentary partly sectional view illustrating the invention in connected relation with a piston and piston rod.

Referring to the drawings for more specific details of the invention, 10 represents generally a wrist or cross head pin connecting a piston rod 12 to a piston 14.

The pin 10 is provided with a curved surface 16 of toroidal radius comprising three separate curved sections 18, 20, and 22 wherein the largest diameter of each section is substantially centralized within the bearings 24 and 26 of the piston and bearing 28 of the piston rod.

Figure 2:
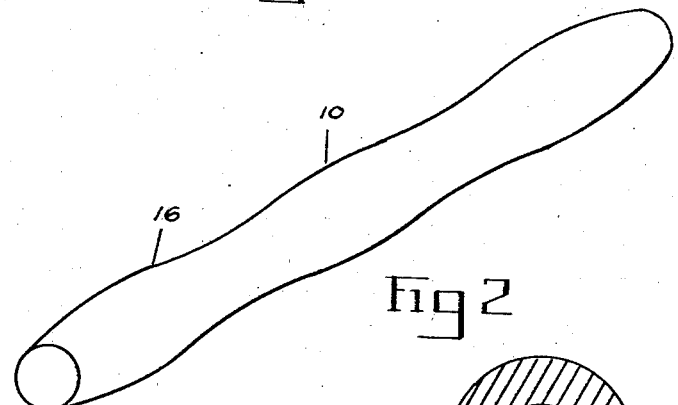
Fig. 2 is a perspective view of the wrist pin constituting the invention.
Figure 3:
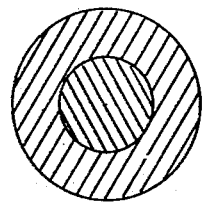
Fig. 3 is a sectional view taken on line 3—3 of Fig. 1.

It is to be observed that because of the curved external nature of the pin 10 that the bearings 24, 26, and 28 in normal relationship to the pin have line bearing contact therewith. The curved section of the pin as shown by the Figs. 1 and 2 are exaggerated for the purpose of explanation only. The length of curvature or radius of the various sections of the pins 18, 20, and 22 would be determined by the amount of deflection imposed upon the pin and of a radius sufficient to keep the pressure away from the edge of the bearing or to prevent it from concentrating at the edge of the bearing. With maximum load this deflection would be effected by the diameter and section of the pin and the load imposed thereon.

The sections 30, 32, and 34 designate diagrammatically the stresses occurring in the respective bearing areas and indicate that no binding is imposed upon the pin or bearings receiving the pin. The stress designations, as shown by Fig. 1, are those occurring under load operating conditions of the pin and associated members wherein the line bearing contact progresses outwardly from the point of contact to the ends of the bearings due to the modulus of elasticity of the pin and bearing material.

Inasmuch as the bearing support area and stresses imposed occur away from the edge of the bearing the possibility of concentration of pressure at the edges of the bearings is minimized. While this form of construction raises the theoretical stresses where no deflection is considered, it materially lowers the stresses which are created by deflection thus reducing the friction of the bearings by preventing binding between the bearings and pin. It is obvious that an alternate construction carrying out the principle of the structure of Fig. 1 can readily be provided by making the bearings 24, 26, and 28 of a curved nature and the pin 10 of true cylindrical external shape so long as line bearing contact is provided between the respective bearings and external surface of the pin.

Figure 4:
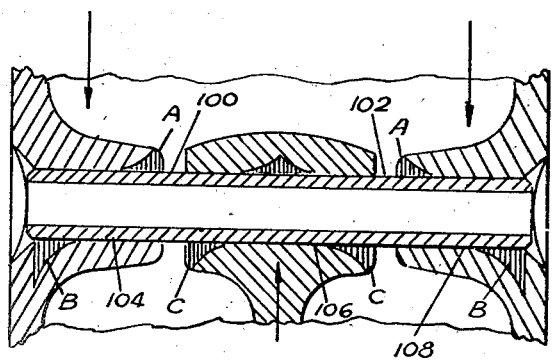
Fig. 4 is a fragmentary partly sectional view of a conventional type of wrist pin in connected relation with a piston and piston rod.

Fig. 4 illustrates a conventional type of cylindrical wrist pin 100 having a uniform outside diameter 102 throughout its length wherein the stresses A, B, and C are shown to occur at the edges of the bearings 104, 106, and 108 respectively of a piston 110 and piston rod 112. It is obvious, as shown, that the pin 100 is deflected proportionately to its section and load, due to the location of the bearings in the piston being at the ends thereof and the bearing of the connecting rod being at the center thereof.

Furthermore wherein it is customary to closely fit the pins in the piston and in the connecting rod to prevent knocking any deflection would obviously bind the pins in the bearings and impose heavy stresses on the bearings in certain localized areas as illustrated by the stress designations in Fig. 4.

While this invention has been described in connection with certain specific embodiments, the principle involved is susceptible of numerous other applications that will readily occur to persons skilled in the art. The invention is, therefore, limited only as indicated by the scope of the appended claims.

What I claim is:

1. A cross-head pin for connecting two members together having a pair of curved surfaces received by one of the members in line bearing contact in axially spaced bearings thereof and a centrally curved section received by the other member in line bearing contact in a bearing thereof, said latter member being arranged centrally of the other member.

2. A pin for connecting two members together having a curved central section received by one of the members centrally of the bearing thereof in line bearing contact, and a pair of end curved sections received in continuously axially aligned bearings of the other member substantially centrally of the bearings in line bearing contact.

3. A pin for connecting a thrust member with a member to be reciprocated thereby comprising a central section of toroidal radius adapted to be received by the thrust member and a pair of end sections of toroidal radius adapted to be received by the member reciprocated by the thrust member outwardly axially disposed from the thrust member.

4. A pin for connecting a thrust member with a member to be reciprocated thereby having end portions supported in line bearing contact in the reciprocated member and a central portion supported in line bearing contact in the thrust member.

5. A wrist pin for connecting a rod to a piston having a curved central section received by the bearing in the rod in line bearing contact and a pair of curved sections, arranged outwardly from the central section, respectively received in bearings of the piston in line bearing contact.

6. A wrist pin for connecting a member having a pair of spaced axially aligned bearings to a member having a bearing adapted to be axially aligned with the bearings of the other member, said pin comprising a central section of toroidal radius adapted to be received by the member having the single bearing in line bearing contact and a pair of end sections of toroidal radius adapted to be respectively received by the bearings in the first member in line bearing contact.

CARL VOORHIES.

REFERENCES CITED

The following references are of record in the file of this patent:

UNITED STATES PATENTS

| Number | Name | Date |
|---|---|---|
| 1,225,355 | Pogne | May 8, 1917 |
| 1,288,786 | Wilschewski | Dec. 24, 1918 |